(12) United States Patent
Jeddeloh

(10) Patent No.: US 6,789,169 B2
(45) Date of Patent: Sep. 7, 2004

(54) EMBEDDED DRAM CACHE MEMORY AND METHOD HAVING REDUCED LATENCY

(75) Inventor: Joseph Jeddeloh, Minneapolis, MN (US)

(73) Assignee: Micron Technology, Inc., Bosie, ID (US)

( * ) Notice: Subject to any disclaimer, the term of this patent is extended or adjusted under 35 U.S.C. 154(b) by 271 days.

(21) Appl. No.: 09/971,841

(22) Filed: Oct. 4, 2001

(65) Prior Publication Data

US 2003/0070044 A1 Apr. 10, 2003

(51) Int. Cl.$^7$ .............................................. G06F 13/00
(52) U.S. Cl. ...................... 711/122; 711/140; 711/144; 711/145
(58) Field of Search ............................. 711/122, 140, 711/144, 145

(56) References Cited

U.S. PATENT DOCUMENTS

| | | | | |
|---|---|---|---|---|
| 4,847,758 A | * | 7/1989 | Olson et al. ................. | 711/133 |
| 5,325,508 A | * | 6/1994 | Parks et al. ................. | 711/118 |
| 5,553,270 A | * | 9/1996 | Rosenbluth ................. | 711/169 |
| 5,761,708 A | * | 6/1998 | Cherabuddi et al. ........ | 711/118 |
| 5,813,030 A | * | 9/1998 | Tubbs ......................... | 711/118 |
| 6,208,273 B1 | * | 3/2001 | Dye et al. .................... | 341/51 |
| 6,226,722 B1 | * | 5/2001 | Shippy et al. .............. | 711/168 |
| 6,425,056 B2 | * | 7/2002 | Meyer ......................... | 711/128 |
| 6,510,492 B2 | * | 1/2003 | Hsu et al. .................... | 711/122 |
| 2003/0014590 A1 | * | 1/2003 | Jeddeloh ..................... | 711/122 |

* cited by examiner

Primary Examiner—Reba I. Elmore
(74) Attorney, Agent, or Firm—Dorsey & Whitney LLP

(57) ABSTRACT

A computer system includes a processor, a system memory, and an integrated circuit system controller coupled to the processor and the system memory. The system controller includes a system memory controller coupled to the system memory, a processor interface coupled to the processor and an embedded cache memory integrated with the memory controller and the processor interface. The cache memory includes at least one DRAM array, at least one tag memory, and at least one cache memory controller. The cache memory controller initiates an access to either or both the DRAM array and the tag memory, as well as the system memory, before the cache memory controller has determined if the access will result in a cache hit or a cache miss. If the cache memory controller determines that the access will result in a cache hit, data are coupled from the DRAM array to the processor. If the cache memory controller determines that the access will result in a cache miss, data are coupled from the system memory to the processor.

50 Claims, 3 Drawing Sheets

EMBEDDED DRAM CACHE MEMORY AND METHOD HAVING REDUCED LATENCY

TECHNICAL FIELD

The present invention relates generally to cache memory for a processor-based system and, more particularly, to an apparatus and method that efficiently utilizes embedded dynamic random access memory ("eDRAM") as a level three (L3) cache in the system controller of a processor based system.

BACKGROUND OF THE INVENTION

The speed at which processors can execute instructions has typically outpaced the speed at which memory systems can supply the instructions and data to the processors. Due to this discrepancy in the operating speeds of the processors and system memory, the system memory architecture plays a major role in determining the actual performance of the system. Most current memory hierarchies utilize cache memory in an attempt to minimize memory access latencies.

Cache memory is used to provide faster access to frequently used instructions and data, which helps improve the overall performance of the system. Cache memory is able to provide faster access for two primary reasons. First, cache memory is generally implemented with static random access memory ("SRAM"), which is substantially faster than dynamic random access memory ("DRAM") that is normally used as system memory. Second, cache memory is normally coupled to the processor directly through a processor bus and thus has a hierarchy that places it closer to the processor. In memory hierarchy, the closer to the processor that the memory resides, the higher the performance of the memory and the overall system. Cache memory is effective to increase the speed at which programs can be executed because programs frequently reuse the same instructions and data. When data or instructions are read from main memory, a copy is usually saved in the cache memory (a cache tag is usually updated as well). The cache then monitors subsequent requests for data and instructions to see if the requested information has already been stored in the cache. If the data has been stored in the cache, which is known as a "cache hit," it is delivered with low latency to the processor. If, on the other hand, the information is not in the cache, which is known as a "cache miss," it must be fetched at a much higher latency from the system memory.

In more advanced processor based systems, there are multiple levels (usually two levels) of cache memory. The first cache level, or level one (L1) cache, is typically the fastest memory in the system and is usually integrated on the same chip as the processor. The L1 cache is faster because it is integrated with the processor and thus has a higher level of hierarchy. This higher level of hierarchy avoids delays associated with transmitting information to, and receiving information from, an external chip. Also, it generally operates at the usually faster speed of the processor. However, since it resides on the same die as the processor, the L1 cache must be relatively small (e.g., 32 Kb in the Intel® Pentium® III processor, 128 Kb in the AMD Athlon™ processor).

A second cache level, or level two (L2) cache, is typically located on a different chip than the processor and has a larger capacity then the L1 cache (e.g., 512 Kb in the Intel® Pentium® III and AMD Athlon™ processors). The L2 cache is slower than the L1 cache, but because it is relatively close to the processor, it is still many times faster than the system memory, which has an even lower level of memory hierarchy. Recently, small L2 cache memories have been placed on the same chip as the processor to speed up the performance of L2 cache memory accesses.

When data is not found in the highest level of the memory hierarchy and a cache miss occurs, the data must be accessed from a lower level of the memory hierarchy. Since each level contains increased amounts of storage, the probability increases that the data will be found. However, each level typically increases the latency or number of cycles it takes to transfer the data to the processor.

FIG. 1 illustrates a typical processor based system 10 having with two levels of cache memory hierarchy. The system 10 includes a processor 20 having an onboard L1 cache 22 that is fabricated on the same chip as the processor 20. The processor 20 is coupled to an off-chip or external L2 cache 24. The system 10 includes a system chipset comprised of a system controller 60 (also known as a "north bridge") and a bus bridge 80 (also known as a "south bridge"). As known in the art, the chipset is the functional core of the system 10. As will be described below, the system controller 60 and bus bridge 80 are used to connect two or more busses and are responsible for routing information to and from the processor 20 and the other devices in the system 10 over the busses to which they are connected.

The system controller 60 contains an accelerated graphics port ("AGP") interface 62, a PCI interface 64 and a host interface 66. Typically, the processor 20 is referred to as the host and is connected to the host interface 66 of the system controller 60 via a host bus 30. The system 10 includes a system memory 50 connected to a memory controller 67 in the system controller 60 via a memory bus 34. The typical system 10 may also include an AGP device 52, such as e.g., a graphics card, connected to the AGP interface 62 of the system controller 60 via an AGP bus 32. Furthermore, the typical system 10 may include a PCI device 56 connected to the PCI interface 64 of the system controller 60 via a PCI bus 36.

The PCI interface 64 is also typically connected to the bus bridge 80 via the PCI bus 36. A single PCI bus 36 may be used, as shown in FIG. 1, or, alternatively, individual PCI busses may be used if so desired. The bus bridge 80 may be coupled through an expansion bus, such as an industry standard architecture ("ISA") bus 42, to a real-time clock (RTC) 82, power management component 84 and various legacy components 86 (e.g., a floppy disk controller and certain direct memory access ("DMA") and complimentary metal-oxide semiconductor ("CMOS") memory registers) of the system 10. A basic input/output system ("BIOS") read only memory 96 ("ROM") and a low pin count ("LPC") device 94 are also connected to the bus bridge 80 via the ISA bus 42. Examples of LPC devices 94 include various controllers and recording devices. The BIOS ROM 96 contains, among other things, the set of instructions that initialize the processor 20 and other components in the system 10. Although not illustrated, the bus bridge 80 may also contain interrupt controllers, such as the input/output ("I/O") advanced programmable interrupt controller ("APIC"). The bus bridge 80 may also be connected to a universal serial bus ("USB") device 92 via a USB bus 38, and to an integrated drive electronics ("IDE") device 90 may be connected via an IDE bus 40. Examples of a USB device 92 include a scanner or a printer. Examples of an IDE device 90 include a floppy disk or hard drives. It should be appreciated that the type of device connected to the bus bridge 80 is system dependent.

As can be seen from FIG. 1, when the processor 20 cannot access information from one of the two caches 22, 24, it is forced to access the information from the system memory 50. As a result, at least two buses 30, 34 and the components of the system controller 60 must be involved to access the information from the system memory 50, thereby increasing the latency of the access. Increased latency reduces the system bandwidth and overall performance. Memory access times are further compounded when other devices e.g., AGP device 52 or PCI device 56, are competing with the processor 20 by simultaneously requesting information from the cache and system memories.

Attempts have been made to solve or at least alleviate the above-described problems by integrating a third level of cache, known as "L3 cache" 68, in the system controller 60, and preferably as part of the memory controller 67. This L3 cache is also known as "eDRAM" because it is normally implemented with dynamic random access memory ("DRAM") embedded in the same integrated circuit in which the system controller 60 is fabricated. Since the L3 cache 68 is closer to the processor 20 than the system memory 50, it has a higher hierarchy and thus a lower latency than the system memory 50. More specifically, the processor 20 can access the L3 cache 68 without having to send or receive information over the memory bus 34. Instead, the processor 20 need only receive data or instructions over the host bus 30. As a result, instructions and data can be read from the L3 cache 68 significantly faster than instructions and data can be read from the system memory 50. Furthermore, since the L3 cache 68 can be implemented with eDRAM, it is economically and technically feasible to make the L3 cache 68 much larger than the L1 and L2 caches 22, 24, respectively, thus reducing the likelihood of a cache miss. The use of an eDRAM L3 cache 68 can therefore increase the system bandwidth and overall performance of the processor based system 10.

Although an L3 cache 68 can increase system bandwidth, the latency of the L3 cache 68 is less than optimum because of delays in initiating an access to the L3 cache 68. More specifically, the processor 20 or other memory access device does not attempt to access the L3 cache 68 until a tag array (not shown in FIG. 1) in the L3 cache 68 has been accessed to determine if the requested data or instructions are stored in the L3 cache. In the event of a cache hit, the requested data or instructions are transferred from the eDRAM array (not shown in FIG. 1) to the processor 20 or other memory requester. Thus, in the event of a cache hit, the requested data or instructions are not transferred until two memory access have occurred, i.e., access to the tag array and access to the eDRAM array. As a result, the access to the L3 cache 68 is not completed for considerable period after the processor 20 has initially attempted to access data or instructions from the L1 cache 22.

The presence of the L3 cache 68 can also cause an increase in the access latency to the system memory 50 in the event data or instructions are not stored in any of the L1, L2 or L3 caches, 22, 24, 68, respectively. The primary reason that the presence of the L3 cache 68 can increase the access latency of the system memory 50 is that the processor 20 or other memory access device does not initiate an access to the system memory 50 until the processor 20 has attempted to access the L3 cache 68 and detected a cache miss. As a result, the access to the system memory 50 is not started for considerable period after the processor 20 has attempted to access data or instructions from the L3 cache.

There is therefore a need for an embedded L3 cache and a method of operating an embedded L3 cache that has reduced latency and that does not increase the latency of accesses to system memory.

SUMMARY OF THE INVENTION

An integrated circuit system controller for use in a processor-based system includes a system memory controller and a level 3 cache memory embedded in the system controller. The level 3 cache memory includes a DRAM array, a tag array, and a cache memory controller coupled to the DRAM array and the tag array. The cache memory controller receives a request for access to the cache memory, and, in response thereto, preferably initiates an access to both the tag memory and the DRAM array. The cache memory controller determines on basis of the tag whether the access to the cache memory will result in a cache hit or a cache miss. If the access will result in a cache hit, the cache memory controller couples data from the DRAM array to the processor. According to one aspect of the invention, the cache memory controller initiates the access to the DRAM array before the cache memory controller determines whether the access to the cache memory will result in a cache hit or a cache miss. According to another aspect of the invention, an access to the system memory is initiated responsive to the request for access to the cache memory. The access to the system memory is preferably initiated before the cache memory controller determines whether the access to the cache memory will result in a cache hit or a cache miss. If the access will result in a cache miss, the data from the system memory is coupled to the processor.

DETAILED DESCRIPTION OF THE INVENTION

Figure 1:
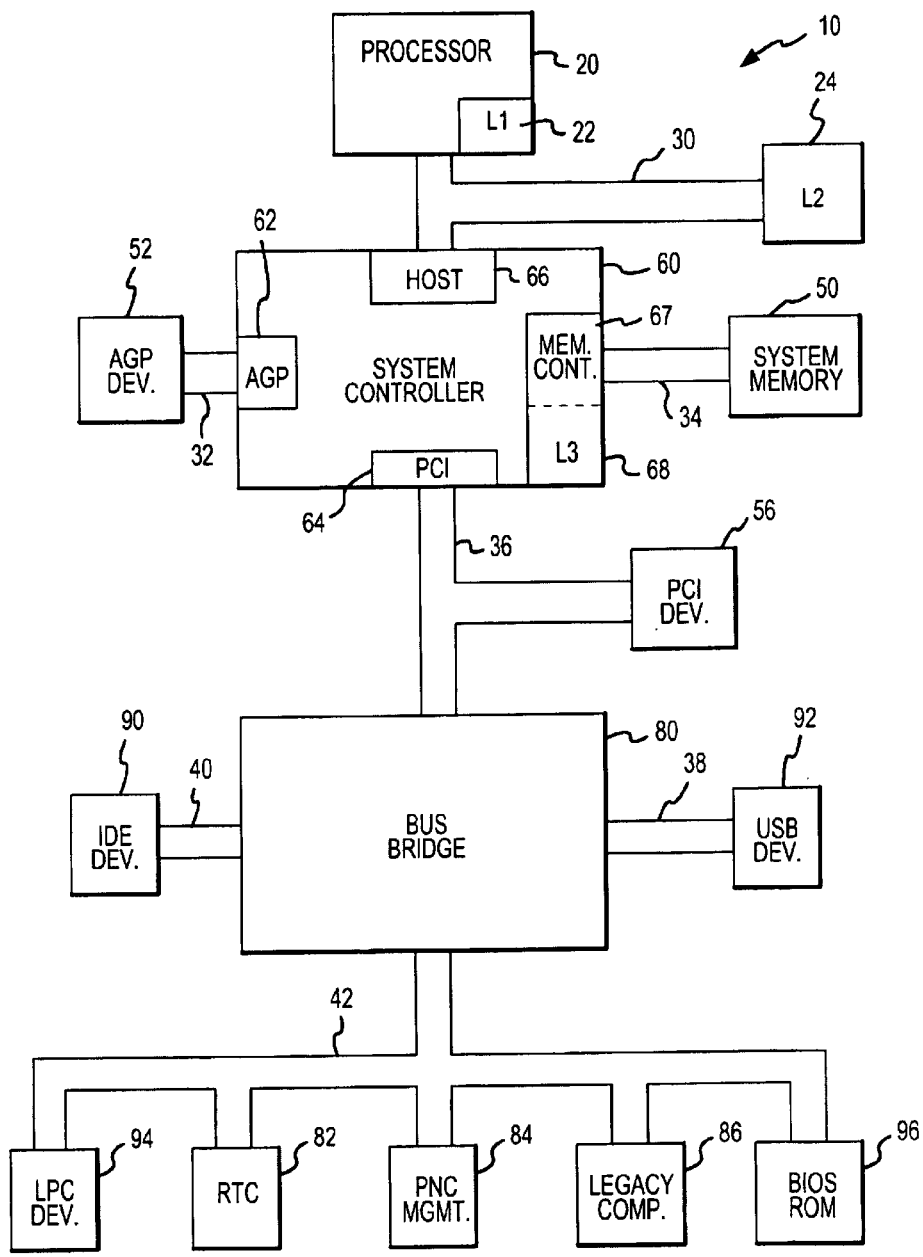
FIG. 1 illustrates a processor-based system having a memory hierarchy with three levels of cache memory, including an eDRAM L3 cache.
Figure 2:
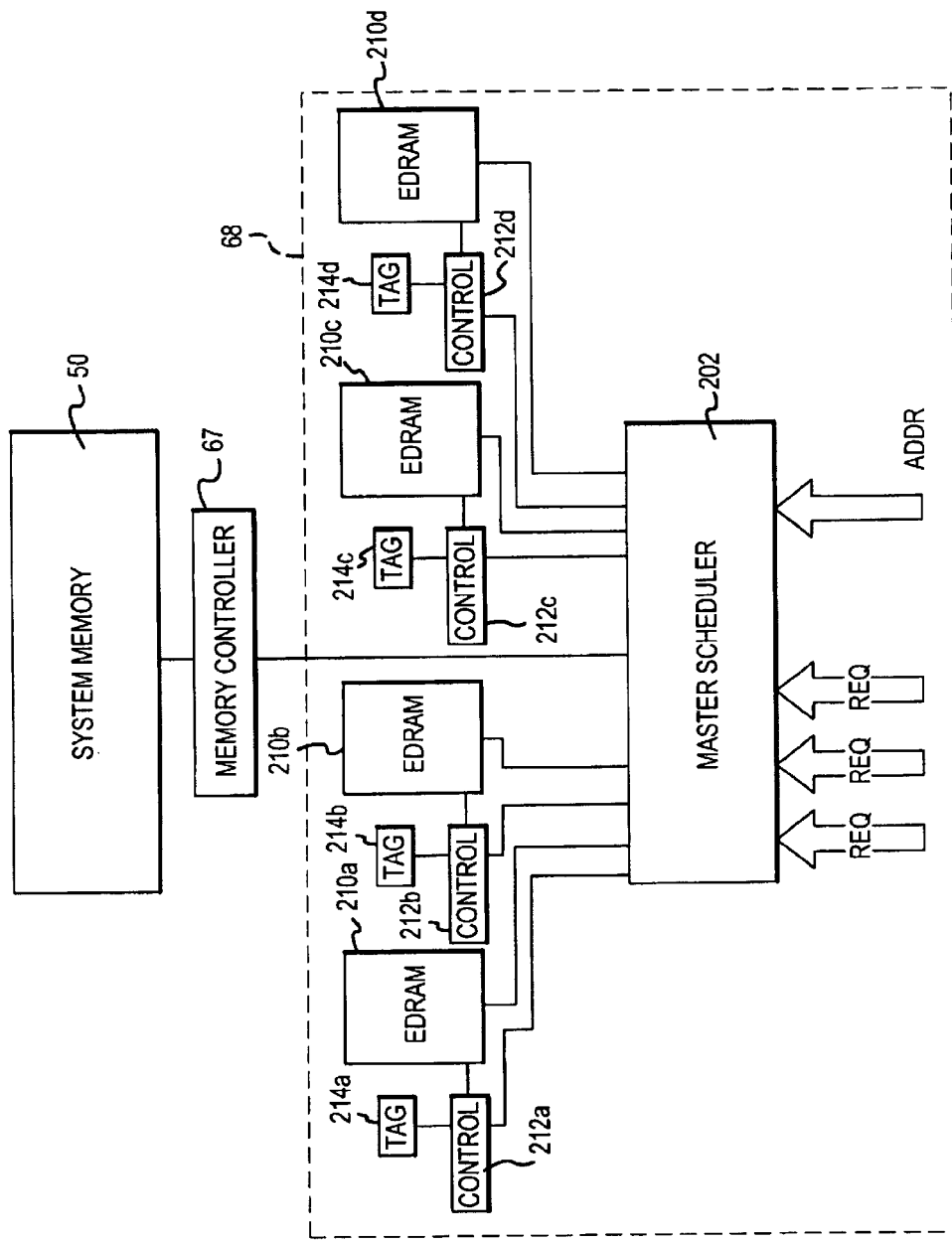
FIG. 2 is a block diagram illustrating an exemplary eDRAM L3 cache utilized in the system illustrated in FIG. 1.

FIG. 2 is a block diagram illustrating an exemplary L3 cache 68 utilized in the system 10 of FIG. 1 according to one embodiment of the invention. The L3 cache 68 is shown in FIG. 2 coupled to the system memory 50 through the memory controller 67. The L3 cache 68 comprises a plurality of eDRAM arrays $210_a$, $210_b$, $210_c$, $210_d$ (collectively referred to herein as "eDRAM arrays 210"). Although FIG. 2 illustrates four eDRAM arrays $210_{a-d}$, it should be appreciated that any number of arrays 210 can be used so that the number of arrays 210 can be application specific. In one embodiment, the L3 cache 68 includes eight independent one Mb eDRAM arrays 210, with each array 210 being 128 bits wide. Thus, in one embodiment, the L3 cache 68 size is eight Mb, which is substantially larger than the sizes of conventional L1 and L2 caches, which typically may have sizes of 128 Kb and 512 Kb, respectively. It should be appreciated that the sizes of the L1, L2 and L3 caches 22, 24, 68 are purely exemplary, and caches having different sizes may alternatively be used.

It is desired that each array $210_a$, $210_b$, $210_c$, $210_d$ have its own local memory controller $212_a$, $212_b$, $212_c$, $212_d$ (collectively referred to herein as "controllers 212"). The controllers 212 include logic to access the arrays 210 and to perform DRAM operations such as e.g., refresh. In one embodiment, the L3 cache 68 is a direct mapped cache, with each array $210_a$, $210_b$, $210_c$, $210_d$ being associated with a respective tag array $214_a$, $214_b$, $214_c$, $214_d$ (collectively referred to herein as "tag arrays 214"). The tag arrays 214 may be implemented with eDRAM also, but other types of memory may be used if desired.

Each entry in the cache 68 is accessed by an address tag stored in the tag arrays 214. As is known in the art, in a direct mapped cache, each main memory address maps to a unique location within the cache. Thus, if the L3 cache 68 is implemented as a direct mapped cache, the addresses from the system memory 50 are given unique addresses in the L3 cache 68. Because each array $210_a$, $210_b$, $210_c$, $210_d$ has its own controller $212_a$, $212_b$, $212_c$, $212_d$ and tag array $214_a$, $214_b$, $214_c$, $214_d$, they are independently accessible. Essentially, the L3 cache 68 comprises a plurality of independent direct mapped caches. It should be appreciated that the L3 cache 68 could be configured to be a fully associative (i.e., main memory addresses can correspond to any cache location) or set associative (i.e., each address tag corresponds to a set of cache location) cache memory if so desired and if space is available on the chipset.

A master scheduler 202 is connected to the eDRAM arrays 210 and the controllers 212 and serves as the controller of the cache 68. Multiple requests REQ are allowed to enter the master scheduler 202, which is responsible for resolving resource conflicts within the cache 68. In essence, the master scheduler 202 serves as a cross-bar controller for the multiple requesters trying to gain access into the cache 68 and for the eDRAM arrays 210 trying to output information to the requestors. The use of independent arrays 210 and the master scheduler 202 reduces bank conflict and read/write turnarounds. The arrays 210 also allow for multiple pages of memory to be kept open, which also reduces latency. Moreover, traffic from several I/O streams, AGP devices, the processor, etc. can be handled concurrently.

Figure 3:
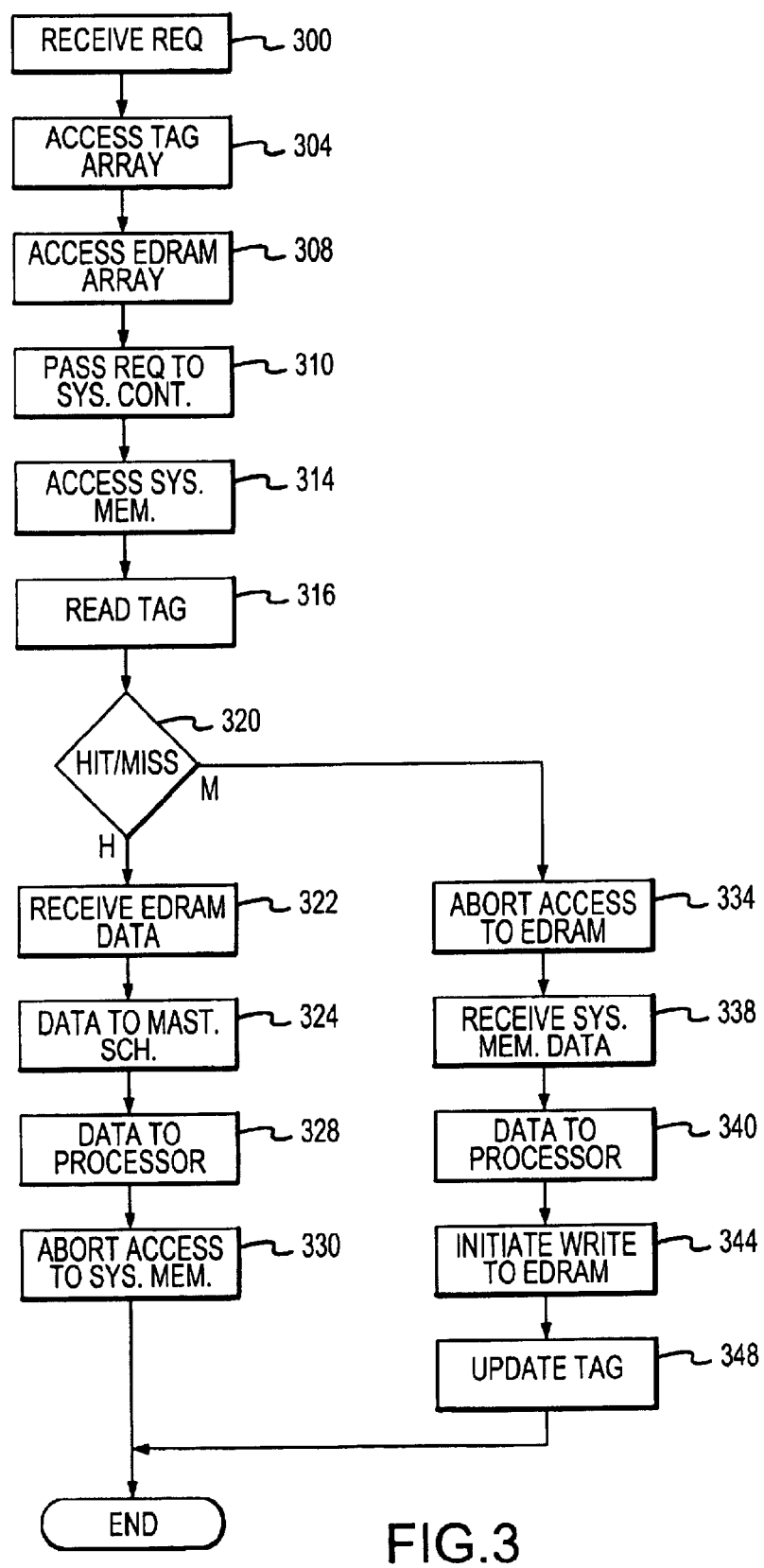
FIG. 3 is a flow chart showing the operation of the eDRAM L3 cache of FIG. 2.

The operation of the processor based system 10 (FIG. 1) using the eDRAM L3 cache 68 shown in FIG. 3 will now be explained with reference to FIG. 3. The L3 cache 68 receives a memory access request REQ in the event of an L1 and L2 cache miss. The request REQ is received at step 300 and applied to the master scheduler 202. The master scheduler 202 passes the REQ on to the controller 212 for the eDRAM array 210 where the requested data may be stored, as determined by the address ADDR. The selected controller 212 then preferably causes three events to occur. These events preferably occur essentially simultaneously, although they are shown in FIG. 3 as being sequentially performed.

First, the REQ causes the controller 212 to initiate an access to the tag array 214 at step 304. Accessing the tag array 214 allows the controller 212 to determine if the requested data or instructions are stored in the eDRAM array 210. Second, the REQ causes the controller 212 to initiates an access to the eDRAM array 210 at step 308. The location access in the eDRAM array 210 is determined by the ADDR. However, at this point, no determination has been made that the requested data or instructions are stored in the eDRAM array 210. Nevertheless, the eDRAM 210 is accessed at step 308 so that the data or instructions will be available sooner if the access to the tag array 214 indicates a cache hit. Finally, the request REQ is passed on to the system memory controller at step 310 in the same manner as if an L3 cache miss was to occur. The system memory controller then accesses the system memory 50 at step 314 at a location determined by the address ADDR.

The controller 212 reads a tag from the tag array 214 at step 316 and determines if the access is a cache hit or a cache miss at step 320. If it is a hit, the controller 212 receives the accessed data from the eDRAM array 210 at step 322. This step 322 may occur immediately if the data or instructions have been accessed from the eDRAM array 210 by the time the tag has been accessed at step 316 and the memory controller 212 makes its cache miss determination at step 320. Otherwise, the controller 212 receives the accessed data or instructions from the eDRAM array 210 after a short delay. However, any delay will be substantially shorter than the delay that would occur using the prior art approach of initiating access to the eDRAM array 210 only after the controller 212 received the tag from the tag array 214 and determined that the access will result in a cache hit. The cache hit may be a page hit in which the row of the eDRAM 210 being accessed is already open, or a page miss in which the data to be accessed is in a row that is different from a row that is currently open. In the event of a page miss, it may also be necessary to precharge the eDRAM array 210 before opening the correct row to access the requested data. In any case, as long as the requested data is stored in the eDRAM array 210, the access will result in a cache hit.

In the event of a cache hit, the memory controller 212 couples the data or instructions to the master scheduler 202 at step 324. The master scheduler 202 then couples the data or instructions to the processor 20 or other memory requester at step 328 and causes the system memory controller to abort the access to the system memory at step 330.

With further reference to FIG. 3, if the controller 212 determines at step 320 that the access to the L3 cache 68 will result in a cache miss, the controller 212 aborts the access to the eDRAM array 210 at step 334 and receives the accessed data from the system memory 50 at step 338. This step 338 may occur immediately if the data or instructions have been accessed from the system memory 50 by the time the tag has been accessed at step 316 and the memory controller 212 makes its cache miss determination at step 320. Otherwise, the controller 212 receives the accessed data or instructions from the system memory 50 after a short delay. However, any delay will be substantially shorter than the delay that would occur using the prior art approach of initiating access to the system memory 50 only after the controller 212 received the tag from the tag array 214 and determined that there was a cache miss. In the event of an L3 cache miss, the controller 212 couples the data read from the system memory 50 to the processor 20 or other memory requester at step 340, and initiates at step 344 a write to the eDRAM array 210 of the data read from the system memory 50. The controller 212 also updates a tag in the tag array 214 corresponding to the address of the data or instructions read from the system memory 50 at step 348.

If there is a cache hit, the local controller 212 accesses the associated eDRAM array 210 and outputs the data or instructions to the master scheduler 202. The master scheduler 202 then routes the data to the appropriate requester. Thus, the architecture of the cache 68 maximizes system throughput. If, on the other hand, a cache miss is detected, the request REQ is forwarded to the system memory 50. The data is returned from the system memory 50 and a cache tag update is scheduled.

In one exemplary embodiment, the L3 cache 68 is eight Mbytes of eDRAM composed of eight independent one Mbyte eDRAM arrays 210. Each array 210, for example, can be 128 bits wide and operate at a 200 MHz, which means that each array 210 can provide 3.2 giga-bytes of information per second.

From the foregoing it will be appreciated that, although specific embodiments of the invention have been described herein for purposes of illustration, various modifications may be made without deviating from the spirit and scope of the invention. For example, although the disclosed embodiment uses an eight Mb L3 cache 68 with 1 Mb eDRAM arrays 210, the L3 cache 68 may be any other size that would increase the performance of the system without adversely impacting the size of the chipset. The sizes of the arrays 210 may also be modified as required to increase the performance of the system. Furthermore, although described with reference to a single processor 20, the multiple processors may be used. Also, for illustration purposes only, the L3 cache 68 is shown as being directly connected to the system memory 50. It should be appreciated, however, that the L3 cache 68 can be connected to the system memory 50 through the switch 172, memory controller 168 and memory bus 34 as shown in FIG. 1 or by any other arrangement deemed suitable for this connection. Also, although the master scheduler 202 has been explained as initiating accesses to both the cache memory 68 and the system memory 50 before receiving a tag from the tag array 214, it will be understood that the master scheduler 202 or other component may delay initiating an accesses to either the cache memory 68 or the system memory 50 until the master scheduler 202 has determined that the access will result in a cache hit. Other variations will also be apparent to one skilled in the art. Accordingly, the invention is not limited except as by the appended claims.

What is claimed is:

1. An integrated circuit for use with a processor based system having a processor and a system memory, the integrated circuit comprising:
   a system memory controller structured to control the system memory of the processor based system;
   a processor interface coupled to the system memory controller, the processor interface structured to transmit information between the processor and the system memory; and
   a cache memory integrated with the system memory controller and the processor interface and coupled to the system memory controller and the processor interface, the cache memory comprising:
      a dynamic random access memory ("DRAM") array;
      a tag memory; and
      a cache memory controller coupled to the DRAM array, the tag memory, the processor interface and the system memory controller, the cache memory controller being operable to receive a request for access to the cache memory, and, in response thereto, to initiate an access to the tag memory and to initiate an access to the DRAM array, the cache memory controller initiating the access to the DRAM array before receiving a tag from the tag memory, the cache memory controller further being operable to determine based on the tag whether the access to the cache memory will result in a cache hit and, in response to determining that the access will result in a cache hit, to couple data from the DRAM array to the processor, the cache memory controller further being operable to apply to the system memory controller a request for access to the system memory responsive to receiving the request for access to the cache memory and before the cache memory controller receives a tag from the tag memory, the cache memory controller being further operable to couple data accessed from the system memory to the processor responsive to the cache memory controller determining that the access to the cache memory will not result in a cache hit.

2. The integrated circuit of claim 1 wherein the cache memory controller is further operable in response to determining that the access will not result in a cache hit, to apply a request to the system memory controller for access to the system memory.

3. The integrated circuit of claim 2 wherein the cache memory controller is further operable to receive data from the system memory responsive to the request for access to the system memory and to write the data received from the system memory to the DRAM array and to update a tag in the tag memory.

4. An integrated circuit for use with a processor based system having a processor and a system memory, the integrated circuit comprising:
   a system memory controller structured to control the system memory of the processor based system;
   a processor interface coupled to the system memory controller, the processor interface structured to transmit information between the processor and the system memory; and
   a cache memory integrated with the system memory controller and the processor interface and coupled to the system memory controller and the processor interface, the cache memory comprising:
      a dynamic random access memory ("DRAM") array;
      a tag memory; and
      a cache memory controller coupled to the DRAM array, the tag memory, the processor interface and the system memory controller, the cache memory controller being operable to receive a request for access to the cache memory, and, in response thereto to initiate an access the tag memory, to initiate an access to the DRAM array, and to initiate an access to the system memory, the cache memory controller being operable to initiate the access to the system memory before the cache memory controller receives a tag from the tag memory, the cache memory controller being further operable to couple data accessed from the system array to the processor responsive to the cache memory controller determining that the access to the cache memory will not result in a cache hit.

5. The integrated circuit of claim 4 wherein the cache memory controller is operable to initiate an access to the DRAM array before the cache memory controller receives the tag from the tag memory.

6. The integrated circuit of claim 5 wherein the cache memory controller is further operable to couple data from the DRAM array to the processor in response to determining that the access will result in a cache hit.

7. The integrated circuit of claim 4 wherein, in response to determining that the access will not result in a cache hit, the cache memory controller is operable to receive data from the system memory responsive to the request for access to the system memory and to write the data received from the system memory to the DRAM array, and to update a tag in the tag memory.

8. An integrated circuit for use with a processor based system having a memory requestor and a system memory, the integrated circuit comprising:
   a system memory controller structured to control the system memory of the processor based system; and
   a master scheduler integrated with the system memory controller and coupled to receive a data access request from the memory requester, the master scheduler being operable to generate a request for a cache memory access in response to receiving the data access request;

a plurality of cache memories integrated with the memory controller and the master scheduler, the cache memories being coupled to the master scheduler, each of the cache memories comprising:
a dynamic random access memory ("DRAM") array;
a tag memory; and
a cache memory controller coupled to the master scheduler, the DRAM array, and the tag memory, the cache memory controller being operable to receive the request for cache memory access, and, in response thereto, to initiate an access to the tag memory and to initiate an access to the DRAM array, the cache memory controller initiating the access to the DRAM array before receiving a tag from the tag memory, the cache memory controller further being operable to determine based on the tag whether the access to the cache memory will result in a cache hit or a cache miss and, in response to determining that the access will result in a cache hit, to couple data from the DRAM array for coupling to the memory requester.

9. The integrated circuit of claim 8 wherein the cache memory controller is further operable to apply to the master scheduler a cache miss indication in response to determining that the access to the cache memory will result in a cache miss, and wherein the master scheduler is operable to apply to the system memory controller a request for access to the system memory responsive to receiving the cache miss indication from the cache memory controller.

10. The integrated circuit of claim 9 wherein the master scheduler is operable to apply the request for access to the system memory to the system memory controller before receiving a cache miss indication from the cache memory controller for one of the cache memories.

11. The integrated circuit of claim 10 wherein the master scheduler is further operable responsive to receiving the cache miss indication from the cache memory controller to couple data from system memory to the memory requester.

12. The integrated circuit of claim 11 wherein the master scheduler is further operable to receive data from the system memory responsive to the request for access to the system memory and to couple the data received from the system memory to one of the cache memories, and wherein the cache memory controller for the one of the cache memories is operable to write the data coupled from the master scheduler to the DRAM array for the cache memory and to update a tag in the tag memory for the cache memory.

13. The integrated circuit of claim 10 wherein the cache memory controller is further operable to apply to the master scheduler a cache hit indication in response to determining that the access to the cache memory will result in a cache hit, and wherein the master scheduler is operable responsive to receiving the cache hit indication from the cache memory controller to couple data from the DRAM array for one of the cache memories to the memory requester.

14. The integrated circuit of claim 10 wherein the memory requestor comprises a processor.

15. The integrated circuit of claim 14 wherein the processor comprises a level 1 cache memory.

16. An integrated circuit for use with a processor based system having a memory requestor and a system memory, the integrated circuit comprising:
a system memory controller structured to control the system memory of the processor based system; and
a master scheduler integrated with the system memory controller and coupled to receive a data access request from the memory requester, the master scheduler being operable in response to receiving the data access request to generate a request for a cache memory access and to initiate an access to the system memory, the master scheduler initiating the access to the system memory before receiving a cache miss indication;
a plurality of cache memories integrated with the system memory controller and the master scheduler, the cache memories being coupled to the master scheduler, each of the cache memories comprising:
a dynamic random access memory ("DRAM") array;
a tag memory; and
a cache memory controller coupled to the master scheduler, the DRAM array, and the tag memory, the cache memory controller being operable to receive the request for cache memory access, and, in response thereto, to initiate an access to the tag memory and to initiate an access to the DRAM array, the cache memory controller further being operable to determine based on the tag whether the access to the cache memory will result in a cache hit or a cache miss and, in response to determining that the access will result in a cache miss, to apply to the master scheduler the cache miss indication.

17. The integrated circuit of claim 16 wherein the cache memory controller is operable to initiate the access to the DRAM array before receiving a tag from the tag memory.

18. The integrated circuit of claim 16 wherein the cache memory controller is further operable to couple data from the DRAM array to the master scheduler in response to determining that the access will result in a cache hit, and wherein the master scheduler is operable to couple data received from the cache memory controller to the memory requester.

19. The integrated circuit of claim 16 wherein the cache memory controller is further operable to couple data from the system memory to the memory requester responsive to receiving a cache miss indication from the cache memory controller for one of the cache memories.

20. The integrated circuit of claim 19 wherein the master scheduler is operable responsive to receiving the cache miss indication from the cache memory controller to couple data from system memory to one of the cache memories, and wherein the memory controller for the one of the cache memories is operable to write the data coupled from the master scheduler to the DRAM array for the cache memory and to update a tag in the tag memory for the cache memory.

21. The integrated circuit of claim 16 wherein the memory requestor comprises a processor.

22. The integrated circuit of claim 21 wherein the processor comprises a level 1 cache memory.

23. A computer system comprising:
a processor;
a system memory;
an integrated circuit system controller coupled to the processor and to the system memory, the system controller comprising:
a system memory controller coupled to the system memory, the system memory controller being structured to control the system memory;
a processor interface coupled to the processor, the processor interface structured to transmit information between the processor and the system controller; and
a cache memory coupled to the system memory controller and the processor interface, the cache memory comprising:
a dynamic random access memory ("DRAM") array;

a tag memory; and a cache memory controller coupled to the DRAM array, the tag memory, the processor interface and the system memory controller, the cache memory controller being operable to receive a request for access to the cache memory, and, in response thereto, to initiate an access to the tag memory and to initiate an access to the DRAM array, the cache memory controller initiating the access to the DRAM array before receiving a tag from the tag memory, the cache memory controller further being operable to determine based on the tag whether the access to the cache memory will result in a cache hit and, in response to determining that the access will result in a cache hit, to couple data from the DRAM array to the processor, the cache memory controller further being operable to apply to the system memory controller a request for access to the system memory responsive to receiving the request for access to the cache memory and before the cache memory controller receives a tag from the tag memory, the cache memory controller being further operable to couple data accessed from the system memory to the processor responsive to the cache memory controller determining that the access to the cache memory will not result in a cache hit.

24. The computer system of claim 23 wherein the cache memory controller is further operable in response to determining that the access will not result in a cache hit, to apply a request to the system memory controller for access to the system memory.

25. The computer system of claim 24 wherein the cache memory controller is further operable to receive data from the system memory responsive to the request for access to the system memory and to write the data received from the system memory to the DRAM array and to update a tag in the tag memory.

26. The computer system of claim 23 wherein the processor further comprises a level 1 cache memory.

27. The computer system of claim 26 further comprising a level 2 cache memory coupled to the processor.

28. The computer system of claim 23, wherein the system controller further comprises a bus interface, and wherein the computer system further comprises an expansion bus coupled to the bus interface.

29. The computer system of claim 28, further comprising a bus bridge coupled between the bus interface of the system controller and a second expansion bus.

30. The computer system of claim 28 wherein the expansion bus comprises a PCI bus.

31. The computer system of claim 28 wherein system controller further comprise a graphics interface, and wherein the computer system further comprises a graphics processor coupled to the graphics interface.

32. A computer system comprising:

a processor;

a system memory;

an integrated circuit system controller coupled to the processor and to the system memory, the system controller comprising:

a system memory controller coupled to the system memory, the system memory controller being structured to control the system memory;

a processor interface coupled to the processor, the processor interface structured to transmit information between the processor and the system memory; and a cache memory integrated with the system memory controller and the processor interface and coupled to the system memory controller and the processor interface, the cache memory comprising:

a dynamic random access memory ("DRAM") array;

a tag memory; and a cache memory controller coupled to the DRAM array, the tag memory, the processor interface and the system memory controller, the cache memory controller being operable to receive a request for access to the cache memory, and, in response thereto to initiate an access the tag memory, to initiate an access to the DRAM array, and to initiate an access to the system memory, the cache memory controller being operable to initiate the access to the system memory before the cache memory controller receives a tag from the tag memory, the cache memory controller being further operable to couple data accessed from the system array to the processor responsive to the cache memory controller determining that the access to the cache memory will not result in a cache hit.

33. The computer system of claim 32 wherein the cache memory controller is operable to initiate an access to the DRAM array before the cache memory controller receives the tag from the tag memory.

34. The computer system of claim 33 wherein the cache memory controller is further operable to couple data from the DRAM array to the processor in response to determining that the access will result in a cache hit.

35. The computer system of claim 32 wherein, in response to determining that the access will not result in a cache hit, the cache memory controller is operable to receive data from the system memory responsive to the request for access to the system memory and to write the data received from the system memory to the DRAM array, and to update a tag in the tag memory.

36. The computer system of claim 32 wherein the processor further comprises a level 1 cache memory.

37. The computer system of claim 36 further comprising a level 2 cache memory coupled to the processor.

38. The computer system of claim 32, wherein the system controller further comprises a bus interface, and wherein the computer system further comprises an expansion bus coupled to the bus interface.

39. The computer system of claim 38, further comprising a bus bridge coupled between the bus interface of the system controller and a second expansion bus.

40. The computer system of claim 38 wherein the expansion bus comprises a PCI bus.

41. The computer system of claim 38 wherein system controller further comprise a graphics interface, and wherein the computer system further comprises a graphics processor coupled to the graphics interface.

42. In a computer system having a memory requester, a system controller coupled to the memory requester, and a system memory, the system controller comprising a system memory controller coupled to the system memory, and a cache memory coupled to the system memory controller and to the memory requester, the cache memory having a DRAM array, the system memory controller and the cache memory being fabricated as a common integrated circuit, a method of accessing data or instructions stored in the system memory and possibly also in the DRAM array of the cache memory, the method comprising:

generating at the memory requester a request for access to the data or instructions;

receiving at the cache memory the request for access to the data or instructions;

initiating an access to the DRAM array before determining whether the access to the DRAM array will result in a cache hit or a cache miss; and applying to the system memory controller a request for access to the system memory responsive to receiving the request for access to the data or instructions and before determining whether the access to the DRAM array will result in a cache hit or a cache miss.

43. The method of claim 42, further comprising coupling data or instructions from the DRAM array to the memory requestor in response to determining that the access to the DRAM array will result in a cache hit.

44. The method of claim 42, further comprising coupling data or instructions from the system memory to the memory requestor in response to determining that the access to the DRAM array will result in a cache miss.

45. The method of claim 44, further comprising writing the data or instructions received from the system memory to the DRAM array.

46. In a computer system having a memory requester, a system controller coupled to the memory requester, and a system memory, the system controller comprising a system memory controller coupled to the system memory, and a cache memory coupled to the system memory controller and to the memory requestor, the cache memory having a DRAM array, the system memory controller and the cache memory being fabricated as a common integrated circuit, a method of accessing data or instructions stored in the system memory and possibly also in the DRAM array of the cache memory, the method comprising:

generating at the memory requester a request for access to the data or instructions;

receiving at the cache memory the request for access to the data or instructions;

initiating an access to the DRAM array responsive to receiving the request for access to the data or instructions; and applying to the system memory controller a request for access to the system memory responsive to receiving the request for access to the data or instructions, the request for access to the system memory being applied to the system memory controller before determining whether the access to the DRAM array will result in a cache hit or a cache miss.

47. The method of claim 46, further comprising coupling data or instructions from the DRAM array to the memory requestor in response to determining that the access to the DRAM array will result in a cache hit.

48. The method of claim 46, further comprising coupling data or instructions from the system memory to the memory requestor in response to determining that the access to the DRAM array will result in a cache miss.

49. The method of claim 48, further comprising writing the data or instructions received from the system memory to the DRAM array.

50. The method of claim 46 wherein the act of initiating an access to the DRAM array responsive to receiving the request for access to the data or instructions comprises initiating the access to the DRAM array before determining whether the access to the DRAM array will result in a cache hit or a cache miss.

* * * * *